United States Patent [19]
Ruth

[11] 3,861,357
[45] Jan. 21, 1975

[54] ANIMAL FEEDER
[76] Inventor: Arthur P. Ruth, P.O. Box 11037, Houston, Tex. 75016
[22] Filed: July 13, 1973
[21] Appl. No.: 378,954

[52] U.S. Cl. ............................................ 119/51.13
[51] Int. Cl. ............................................. A01k 05/02
[58] Field of Search.......... 119/51.11, 51.12, 51.13, 119/51.14, 51.15, 51.5, 56 R, 56 A

[56] References Cited
UNITED STATES PATENTS
| | | | |
|---|---|---|---|
| 1,214,881 | 2/1917 | Berntzen | 119/56 A UX |
| 1,622,443 | 3/1927 | Halvarsson | 119/56 B X |
| 2,538,413 | 1/1951 | Chard | 119/51.11 X |
| 3,581,711 | 6/1971 | Bates | 119/51.5 |

*Primary Examiner*—Hugh R. Chamblee

[57] ABSTRACT

An animal feeder which incorporates a plurality of bins adapted to receive and store animal feed, each bin being pivotally mounted on a transverse shaft and tipped by timed mechanism from an erect position to rotate about the shaft, spilling the animal feed from the bin. The bin is open at the top, and when it is tipped, the feed therein spills out. The timed means incorporates a cam mounted on a rotating shaft at a timed rate which tips the bin past an equilibrium point.

3 Claims, 4 Drawing Figures

PATENTED JAN21 1975 3,861,357

ANIMAL FEEDER

BACKGROUND OF THE INVENTION

It is often inconvenient to feed confined animals on a daily basis. Pets and livestock require feed on a regular basis. The animal feeder of the present invention has been devised to cure this problem. It enables the owner of the animals to be away for several days without having to find someone to feed the animals. The device of the present invention is installed by an owner for feeding his pets or livestock. The device is preferably filled with animal feed and the timer is initiated in operation. The feeder dispenses feed at the requisite intervals, thereby providing good care for the pets or livestock.

SUMMARY OF THE INVENTION

The present invention is an animal feeder having a number of upwardly facing bins which are open at the top. They are filled from the top with a specified quantity of animal feed. The bins are pivotally mounted on a transverse shaft and are maintained in an upright posture by leaning against a timer mechanism. The timer mechanism includes a shaft which is rotated by a timer motor. The shaft supports a projecting lob which is rotated on the shaft in contact with the bin. The lob forces the bin forward past its equilibrium position, causing the bin to dump its contents. The number of bins may be varied. One bin is provided for each feeding interval.

DESCRIPTION OF THE PREFERRED EMBODIMENT

Figure 1:
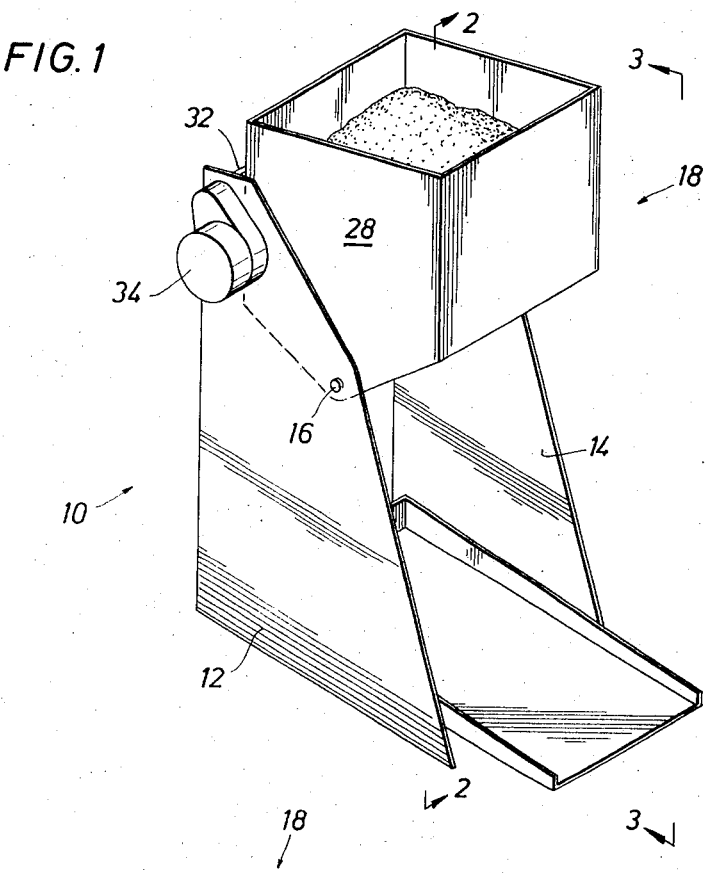
FIG. 1 is a perspective view of a single animal feeder constructed in accordance with the present invention.
Figure 3:
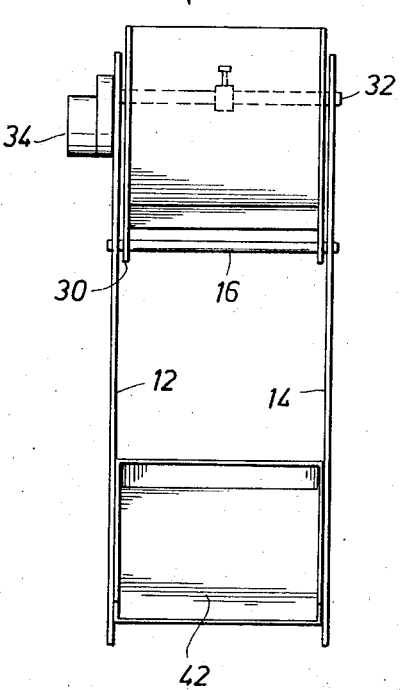
FIG. 3 is a front view of the animal feeder of FIG. 1.

Attention is first directed to FIG. 1 where an animal feeder 10 is shown. The animal feeder 10 incorporates a stand which is constructed of first and second side walls 12 and 14. The walls 12 and 14 support a generally horizontal shaft 16 which is beneath a bin 18. The shaft 16 supports the bin 18 for filling and eventual dumping as will be described.

Figure 2:
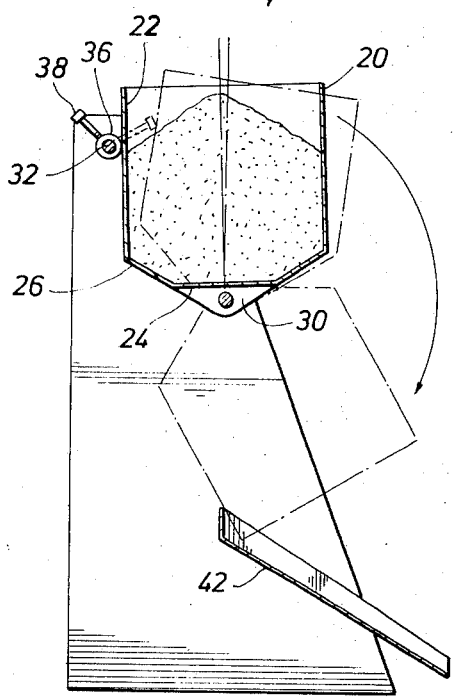
FIG. 2 is a sectional view along the line 2—2 of FIG. 1 illustrating details of construction of the bin showing a tipping position in dotted line.

In FIG. 2, the bin 18 is shown in greater detail. The bin includes a front wall 20, a generally parallel back wall 22, and a bottom wall 24. The bin 18 is more or less rectangular although the bottom wall 24 includes an angled portion 26. The bin 18 includes an end wall 28 better shown in FIG. 1. The wall 28 extends downwardly to a bottom located tab 30 shown in FIG. 2. The tab is duplicated at both sides of the bin. The two tabs are perforated to receive a transverse shaft 16. The shaft 16 supports the bin for rotation about the shaft.

The bin 18 is shown leaning somewhat to the left in FIG. 2, and is supported by a shaft 32. The shaft 32 is preferably parallel to the shaft 16. The shaft 32 passes through the end walls 12 and 14. A motor 34 incorporating an appropriate gear box rotates the shaft 32 as illustrated in FIG. 1. The shaft 32 includes a collar 36 which supports a bolt 38 which functions as a cam lob. The bolt 38 is rotated against the back wall 22 of the bin. In the full line position of FIG. 2, the bin rests with its center of gravity to the left of a vertical through the shaft 16. This tips the bin to the left, resting on the shaft 32 at the sleeve 36 on the shaft. In the full line position, the bin can be filled without fear of tipping. When the cam lob 38 is at some angle away from the bin, the bin is supported in the full line position. When the shaft 32 is rotated, it operates a timer mechanism bringing the cam lob 38 into contact with the bin. Only a minimal amount of torque is required when the cam lob 38 contacts the bin 18 and rotates it partly toward the dotted line position of FIG. 2. The center of gravity moves to the right of a vertical line through the shaft 16. This creates a torque tending to rotate the bin in a clockwise direction. The bin thus rotates, dumping the contents. The bin rotates downwardly until it is engaged by a trough 42 which is fixed between the end walls 12 and 14. It slopes forwardly to deliver the animal feed to a point in front of the feeder, more convenient for feeding.

Figure 4:
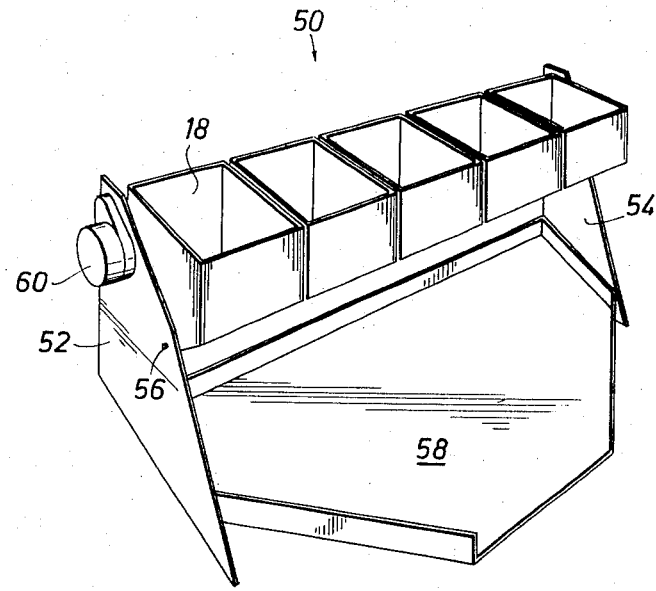
FIG. 4 is an alternative embodiment incorporating multiple compartments arranged along a common shaft.

Attention is next directed to FIG. 4. An alternative embodiment 50 utilizes the bin 18 which is duplicated at multiple points along the embodiment 50. The end walls 52 and 54 are further apart and the shaft 56 is substantially longer. The feed trough 58 is similar to the trough 42 but it is wider. Several bins are included. The number is subject to variation. The several bins are all operated by an elongate shaft which cooperates with a timing motor 60. The shaft functions in the same manner as the shaft 32 previously described. An individual cam lob is located behind each bin 18. The cam lobs are angularly positioned with respect to one another and the motor 60 operates at a rate of speed which causes the bins 18 to be dumped after timed intervals. Each bin will dump when required. This enables the apparatus to deliver feed on a scheduled basis.

An apparatus has been provided which enables feed to be dispensed on a timed basis so that the animals which are fed by the device can rely on feeding at specified intervals. The device can be set up to dispense feed on a daily basis. One bin is dumped each day. To accomplish this, the shaft and cam lobs supported by the shaft must be rotated at a speed to accomplish this purpose.

The bins are open topped in the illustrated embodiment. They can be covered with a top or lid with a small opening in the front wall 20 just below the lid. The opening will be at the bottom most position when the bin rotates to the dotted line position of FIG. 2 and opens into the trough 42 to dump the feed. A cover or top enables the device to be used exposed to the weather where rain will not accumulate in the bin.

The scope of the present invention is determined by the appended claims.

I claim:

1. An animal feeder comprising:
   a bin for receiving and storing animal feed therein, said bin including an open upper end and a bottom thereacross;
   a stand;
   a first shaft supported by said stand;
   means connected to said bin and rotatably engaged with said shaft for pivotal movement of said bin from a generally upright position for receiving and storing feed and also for movement to a position dumping feed therefrom by gravity fall;

a second shaft parallel to said first shaft;

a cam lob projecting from said second shaft;

said second shaft being positioned relative to said first shaft such that said bin is held in a generally upright position by resting against said second shaft and said cam lob rotates against said bin to push it laterally from said second shaft and past a point where it tends to rotate of its own weight to a dumping position; and, a motor operating at a specified rate connected to said second shaft to rotate said cam lob.

2. The apparatus of claim 1 wherein said bin includes side walls extending from said bottom.

3. The apparatus of claim 1 wherein a second bin is pivotally mounted on said first shaft and a second cam lob is located on said second shaft adjacent to said second bin for rotatively tipping said second bin to a dumping position and said first and second cam lobs are angularly displaced from one another to enable said first and second bins to dump sequentially separated by a specified interval.

* * * * *